United States Patent
Bouda

(10) Patent No.: US 8,948,598 B2
(45) Date of Patent: Feb. 3, 2015

(54) SYSTEM AND METHOD FOR INCREASING UPSTREAM CAPACITY IN AN OPTICAL NETWORK

(75) Inventor: Martin Bouda, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 1042 days.

(21) Appl. No.: 12/233,224

(22) Filed: Sep. 18, 2008

(65) Prior Publication Data

US 2009/0202245 A1 Aug. 13, 2009

Related U.S. Application Data

(60) Provisional application No. 61/028,336, filed on Feb. 13, 2008.

(51) Int. Cl.
H04J 14/08 (2006.01)
H04J 14/02 (2006.01)

(52) U.S. Cl.
CPC ......... *H04J 14/0226* (2013.01); *H04J 14/0282* (2013.01); *H04J 14/0232* (2013.01);
(Continued)

(58) Field of Classification Search
CPC . H04J 14/0226; H04J 14/0247; H04J 14/025; H04J 14/0252; H04J 14/0232; H04J 12/0238; H04J 14/0282
USPC .......... 398/58, 63, 66–75, 79, 82, 91, 98, 165
See application file for complete search history.

(56) References Cited

U.S. PATENT DOCUMENTS 4,555,810 A 11/1985 Khoe et al.
5,285,305 A 2/1994 Cohen et al.
(Continued)

FOREIGN PATENT DOCUMENTS

EP 1 028 331 8/2000
EP 1 130 806 A2 9/2001
(Continued)

OTHER PUBLICATIONS

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.
(Continued)

*Primary Examiner* — Julio J Maldonado
*Assistant Examiner* — Joshua King
(74) *Attorney, Agent, or Firm* — Baker Botts L.L.P.

(57) ABSTRACT

A method for communicating in a passive optical network (PON), includes receiving traffic from a plurality of optical network units (ONUs) transmitting in an upstream transmission channel, wherein each of the ONUs may transmit at any wavelength within a wavelength band associated with the upstream transmission channel. The method also includes dividing the upstream transmission channel into a plurality of sub-channels, that each include a subset of the wavelength band associated with the upstream transmission channel. The method further includes determining the identity of each of the plurality of ONUs transmitting in each of the sub-channels, assigning a plurality of ONUs transmitting in the upstream transmission channel to each of at least two of the sub-channels based on the determination of the ONUs transmitting in that sub-channel, and allocating transmission timeslots for time-shared transmission by the ONUs in one or more of the sub-channels.

23 Claims, 3 Drawing Sheets

(52) U.S. Cl.
CPC ......... *H04J14/0238* (2013.01); *H04J 14/0247* (2013.01); *H04J 14/025* (2013.01); *H04J 14/0252* (2013.01)
USPC ................. 398/98; 398/63; 398/66; 398/67; 398/68; 398/69; 398/70; 398/71; 398/72; 398/73; 398/74; 398/75; 398/79; 398/82; 398/91; 398/58; 398/165

(56) References Cited

U.S. PATENT DOCUMENTS

| | | | |
|---|---|---|---|
| 5,321,541 | A | 6/1994 | Cohen |
| 5,440,416 | A | 8/1995 | Cohen et al. |
| 5,579,421 | A | 11/1996 | Duvall et al. |
| 5,694,234 | A | 12/1997 | Darcie et al. |
| 5,926,298 | A | 7/1999 | Li |
| 6,144,472 | A | 11/2000 | Knox |
| 6,163,637 | A | 12/2000 | Zirngibl |
| 6,411,410 | B1 | 6/2002 | Wright et al. |
| 6,498,876 | B1 | 12/2002 | Liu et al. |
| 6,767,139 | B2 | 7/2004 | Brun et al. |
| 7,245,829 | B1 | 7/2007 | Sindile |
| 7,386,236 | B1 | 6/2008 | Kuo et al. |
| 7,389,048 | B2 | 6/2008 | Kani et al. |
| 2002/0191904 | A1* | 12/2002 | Kani et al. ............. 385/24 |
| 2002/0196491 | A1 | 12/2002 | Deng et al. |
| 2003/0002102 | A1 | 1/2003 | Khalfallah et al. |
| 2004/0001718 | A1 | 1/2004 | Matthews |
| 2004/0131357 | A1 | 7/2004 | Farmer et al. |
| 2004/0131358 | A1* | 7/2004 | Jung et al. ............. 398/72 |
| 2004/0184806 | A1 | 9/2004 | Lee et al. |
| 2004/0264963 | A1* | 12/2004 | Kani et al. ............. 398/72 |
| 2005/0129404 | A1 | 6/2005 | Kim et al. |
| 2005/0175343 | A1 | 8/2005 | Huang et al. |
| 2005/0175344 | A1 | 8/2005 | Huang et al. |
| 2005/0180689 | A1 | 8/2005 | Kozhevnikov et al. |
| 2006/0056849 | A1 | 3/2006 | Pamart et al. |
| 2006/0153567 | A1 | 7/2006 | Kim et al. |
| 2006/0222365 | A1* | 10/2006 | Jung et al. ............. 398/72 |
| 2007/0092249 | A1 | 4/2007 | Akasaka et al. |
| 2007/0092250 | A1 | 4/2007 | Bouda et al. |
| 2007/0092251 | A1 | 4/2007 | Bouda et al. |
| 2007/0092252 | A1 | 4/2007 | Bouda et al. |
| 2007/0092253 | A1 | 4/2007 | Bouda et al. |
| 2007/0092254 | A1 | 4/2007 | Bouda |
| 2007/0092255 | A1 | 4/2007 | Bouda |
| 2007/0092256 | A1* | 4/2007 | Nozue et al. ............. 398/72 |
| 2007/0166037 | A1 | 7/2007 | Palacharla et al. |
| 2007/0166043 | A1 | 7/2007 | Bouda et al. |
| 2007/0183779 | A1 | 8/2007 | Bouda et al. |
| 2007/0280690 | A1 | 12/2007 | Bouda et al. |
| 2007/0280691 | A1 | 12/2007 | Bouda et al. |
| 2008/0050119 | A1* | 2/2008 | Effenberger ............. 398/68 |

FOREIGN PATENT DOCUMENTS

| | | | |
|---|---|---|---|
| EP | 1 434 375 A2 | 6/2004 | |
| WO | WO 0052865 A1 * | 9/2000 | ............. H04J 14/02 |
| WO | WO 2007/047559 | 4/2007 | |
| WO | WO 2007/081748 | 7/2007 | |

OTHER PUBLICATIONS

European Patent Office, European Search Report and Office Action, Application No. 07010686.9-2415, Mailed Aug. 21, 2007, 14 pages.
International Searching Authority, "Noiffication of Transmittal of the International Search Report and Mailed the Written Opinion of the International Searching Authority, or the Declaration," (PCT Rule 44.1), International Application No. PCT/US2007/002851, mailed Aug. 21, 2007, 11 pages, Jun. 28, 2007.
International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System issues for a WDM-Based Fiber Loop Architecture," Journal of Lightwave Technology, IEEE Service Center, New York, NY, vol. 7, No. 11, Nov. 1, 1989, pp. 1759-1768.
Frigo et al., "A Wavelength-Division Multiphned Passive Optical Network with Cost-Shared Components," IEEE Photonics Technology Letters, IEEE Service Center, Piscataway, NJ, vol. 4, No. 11, Nov. 1, 1994, pp. 1365-1367.
Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.
Son et al., "Bidirectional WDM Passive Optical Network for Simultaneous Transmission of Data and Digital Broadcast Video Service," Journal of Lightwave Technology, vol. 21, No. 8, Aug. 2003, pp. 1723-1727.
Ching et al., "Passive Optical Networks," Sharing the Fiber, Telecom Equipment-Wireline, Merrill Lynch, May 15, 2001, pp. 1-27.
Kuhlow et al., "AWG-Based Device for a WDM Overlay PON in the 1.5-μm Bank," IEEE Photonics Technology Letters, vol, 11, No. 2, Feb. 1999, pp. 218-220.
Feldman et al., "An Evaluation of Architectures Incorporating Wavelength Division Multiplexing for Broad-Bank Fiber Access," Journal of Lightwave Technology, vol. 16, No. 9, Invited Paper, Sep. 1998, pp, 1546-1519.
Giles et al., "Access PON Using Downstream 1550-nm WDM Routing and Upstream 1300-nm SCMA Combining Through a Fiber•Grating Route," IEEE Photonics Technology Letters, vol. 8, No. 11, Nov. 1996, pp. 1549-1551.
Hilbk et al., "High Capacity WDM Overlay on a Passive Optical Network," Electronic Letters, Nov. 7, 1996, vol. 32, No. 23, pp. 2162-2163.
Inoue et al., "Silica-based Arrayed-Waveguide Grating Circuit as Optical Splitter/Router," Electronic Letters, Apr. 27, 1995, vol. 31, No. 9, pp. 726-727.
Kashima, "Upgrade of Passive Optical Subscriber Network," Journal of Lightwave Technology vol. 9, No. 1, Jan. 1991, pp. 113-120.
Lin, "Passive Optical Subscriber Loops with Multiaccess," Journal of Lightwave Technology, vol. 7, No. 11, Nov. 1989, pp. 1769-1777.
Moog Component Group, "(Mems)* Singlemode Fiber Optic Switch," FO5935, 2 pages, 2005.
Light Reading—Networking the Telecom Industry, PON & FTTx Update, Introduction, Aug. 8, 2005, *Light Reading*, Aug. 8, 2005, printed from web site Jan. 26, 2006, pp. 1-11.
ITU-T Telecommunication Standardization Sector of ITU-T, G.984. 1, "Gigabit-Capable Passive Optical Network (GPON): General Characteristics," Series G: Transmission Systems and Media, Digital Systems and Networks, Digital Sections and Digital Line System—Optical Line Systems for Local and Access Networks, Mar. 2003, 20 pages.
ITU-T Telecommunication Standardization Sector of ITU-T, G.983. 1, "Broadband Optical Access Systems Based on Passive Optical Networks (PON)," Series G: Transmission Systems and Media, Digital Systems and Networks, Digital Sections and Digital Line System—Optical Line Systems for Local and Access Networks, 124 pages, Jan. 2005, 123 pages.
ITU-T Telecommunication Standardization Sector of ITU-T, G.983. 3, "A Broadband Optical Access System with Increased Service Capability by Wavelength Allocation," Series G: Transmission Systems and Media, Digital Systems and Networks, Digital Sections and Digital Line System—Optical Line Systems for Local and Access Networks, Mar. 2001, 59 pages.
ITU-T Telecommunication Standardization Sector of ITU-T, G.984. 3, "Gigabit-Capable Passive Optical Network (G-PON): Transmission Convergence Layer Specification," Series G: Transmission Systems and Media, Digital Systems and Networks, Digital Sections and Digital Line System—Optical Line Systems for Local and Access Networks, Feb. 2004, 116 pages.
ITU-T Telecommunication Standardization Sector of ITU-T, G.984. 3, Series G: Study Period 2005-2008, "Updated Revised Amendment

(56) References Cited

OTHER PUBLICATIONS

1, : Amendment to Gigabit-Capable Passive Optical Network (G-PON): Transmission Convergence Layer Specification (2004)," pp. 1-39, May 16-27, 2005.
Green, Paul E. Jr., Telecommunications Consultant, "Fiber-to-the-Home White Paper,", Feb. 21, 2003, pp. 1-21.
Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.
Son et al.; "Survivable Network Architectures for WDM PON;" Korea Advanced Institute of Science and Technology; 2005 Optical Society of America, 3 Pages, Mar. 6, 2005.
Smith, Stephen, "Business Class Services Over a GPON Network," Fujitsu Network Communications; 10 pages, Mar. 5, 2006.
Wang et al.; "A Novel Centrally Contralled Protection Scheme for Traffic Restoration in WDM Passive Optical Networks;" IEEE Photonics Technology Letters, vol. 17, No. 3; Mar. 2005, pp. 717-719.
Suzuki et al.; "A Reliable Wide Area WDM-PON Using Wavelength-Shifted Protection Scheme," Access Network Service Systems Laboratories, NTT Corporation; 2 pages, Sep. 25, 2005.
ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15, 2001 through Oct. 26, 2001.
Phillips et al.; "Redundancy Strategies for a High Splitting Optically Amplified Passive Optical Network," Journal of Lightwave Technology, vol. 19, No. 2; pp. 137-149, Feb. 2001.
Chan et al.; "A Novel Bidirectional Wavelength Division Multiplexed Passive Optical Network with 1:1 Protection;" Friday Morning, OFC, vol. 2; pp. 779-781, 2003.
Sun et al.; "A Novel Star-Ring Protection Atchitecure Scheme for WDM Passive Optical Access Networks;" Department of Information Engineering, The Chinese University of Hong Kong; 3 pages, Mar. 6, 2005.
Hirth, Ryan, "1 Gbps to 10 Gbps Migration," Teknovus, Access the Future, IEEE Meeting, Jul. 2006, San Diego, CA, pp. 1-7.
Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.
Handley et al., "A Comparison of WDM PON Architectures," Proceedings of the European Conference on Network and Optical Communications, Broadband Access and Technology. Amsterdam, IOS Press, NL, vol., part 1, pp. 141-147, Jan. 1, 1999
Zhang et al., "A Review of Routhing and Wavelength Assignment Approaches for Wavelength-Routed Optical WDM Networks," Optical Networks Magazine, SPIE, Bellingham, WA, US, vol. 1, No. 1, Jan. 2000, pp. 47-60, Jan. 1, 2000.
Langer et al., "Promising Evolution Paths for Passive Optical Access Networks," 2004 IEEE, Proceedings of 2004 6th International Conference on Warsaw, Piscataway, NJ, vol. 1, pp. 202-207, Jul. 4, 2004.
Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.
International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.
Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.
International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.
International Starching Authority, "Notification of Transmittal of the International Search Report the Written Opinion of the International Searching Authority, or the Declaration," (PCT Rule 44.1), International Application No. PCT/US2006/040318, mailed Feb. 14, 2007, 13 pages.
International Searching Authority, "Notification of Transmittal of the International Search Report and the Written Opinion of the International Authority, or the Declaration," (PCT Rule 44.1), International Application No. PCT/US2006/040330, mailed Feb. 19, 2007, 13 pages.
International Searching Authority, "Notification of Transmittal of the International Search Report and the Written Opinion of the International Authority, or the Declaration," (PCT Rule 44.1), International Application No. PCT/US2006/040605, mailed Feb. 14, 2007, 14 pages.
International Searching Authority, "Notification of Transmittal of the International Search Report and the Written Opinion of the International Authority, or the Declaration," (PCT Rule 44.1), International Application No. PCT/US2006/042224, mailed Mar. 5, 2007, 13 pages.
International Searching Authority, "Notification of Transmittal of the International Search Report and the Written Opinion of the International Authority, or the Declaration," (PCT Rule 44.1), International Application No. PCT/US2006/040597, mailed Mar. 5, 2007, 15 pages.
International Searching Authority, "Notification of Transmittal of the International Search Report and the Written Opinion of the International Authority, or the Declaration," (PCT Rule 44.1), International Application No. PCT/US2006/042220, mailed Mar. 12, 2007, 12 pages.
International Searching Authority, "Notification of Transmittal of the International Search Report and the Written Opinion of the International Authority, or the Declaration," (PCT Rule 44.1), International Application No. PCT/US2006/043188, mailed Mar. 14, 2007, 12 pages.
Bouda, "A Hybrid Passive Optical Network Utting Shared Wavelengths," filed Feb. 3, 2006, 65 pages, 9 drawings, U.S. Appl. No. 11/347,434, Pending.
Bouda, "A Distribution Node for a Wavelength-Sharing Network," filed Feb. 3, 2006, 64 pps., 9 drawings, U.S. Appl. No. 11/347,612, Pending.
Bouda et al., "Distribution Components for a Wavelength-Sharing Network," filed Feb. 3, 2006, 69 pages., 9 drawings, U.S. Appl. No. 11/347,585, Pending.
Bouda et al., "Upgradeable Passive Optical Network," filed Feb. 3, 2006, 66 pages, 9 drawings, U.S. Appl. No. 11/347,446, Pending.
Palacharla et al., "System and Method for Managing Network Components in a Hybrid Passive Optical Network," filed Oct. 25, 2006, 43 pages., 4 drawings, U.S. Appl. No. 11/552,696, Pending.
Bouda, "System and Method for Transmitting Traffic in a Plurality of Passive Optical Networks," filed Jan. 26, 2007, 35 pages., 5 drawings, U.S. Appl. No. 11/627,793, Pending.
Bouda, "System and Method for Transmitting Upstream Traffic in an Optical Network," filed Jun. 27, 2006, 49 pages., 5 drawings., U.S. Appl. No. 11/426,875, Pending.
Bouda, "Method and System for Managing Power in an Optical Network," filed Feb. 28, 2007, 35 pages, 6 drawings, U.S. Appl. No. 11/680,186, Pending.
Bouda, "System and Method for Managing Different Transmission Architectures in a Passive Network," 42 pages, 4 drawings, filed Jan. 26, 2007, U.S. Appl. No. 11/627,809, Pending.
Bouda, "System and Method for Distributing Traffic in an Optical Network, filed Jun. 27, 2006, ," 43 pages, 5 drawings, U.S. Appl. No. 11/426,879, Pending.
Akasaka et al,, "System and Method for Traffic Distribution in an Optical Network," filed Jun. 27, 2006, 71 pps, 12 drawings, U.S. Appl. No. 11/426,884, Pending.
Bouda et at., "Method and System for Increasing Downstream Bandwidth in an Optical Network," filed Jan. 5, 2007, 42 pages, 10 drawings, U.S. Appl. No. 11/620,144, Pending.
Bouda, "Distribution Node for an Optical Network," filed Jan. 4, 2007, 38 pps., 6 drawings, U.S. Appl. No. 11/619,945, Pending.

(56) References Cited

OTHER PUBLICATIONS

Palacharla et al.., System and Method for Managing Communication in a Hybrid Passive Optical Network, filed May 2, 2007, 50 pages, 6 drawings, U.S. Appl. No. 11/743,311, Pending.

Akasaka et al., "System and Method for Protecting an Optical Network," filed Dec. 11, 2006, 42 pages, 4 drawings, U.S. Appl. No. 11/609,120, Pending.

Bouda et al., "System and Method for Extending Reach in a Passive Optical Network," filed Jan. 31, 2007, 51 pages, 5 drawings, U.S. Appl. No. 11/669,657, Pending.

Bouda, "System and Method for Transmitting Optical Markers in a Passive Optical Network System," 52 pages, 58 pp. drawings, filed Jan. 31, 2007, U.S. Appl. No. 11/669,677, Pending.

\* cited by examiner

SYSTEM AND METHOD FOR INCREASING UPSTREAM CAPACITY IN AN OPTICAL NETWORK

CROSS-REFERENCE TO RELATED APPLICATIONS

The application claims benefit under 35 U.S.C. §119(e) of U.S. Provisional Application Ser. No. 61/028,366 filed Feb. 13, 2008 by Bouda and entitled System and Method for Increasing Loss Budget and Upstream Capacity in an Optical Network.

TECHNICAL FIELD

The present disclosure relates generally to communication systems and, more particularly, to a system and method for increasing reach and upstream capacity in an optical network.

BACKGROUND

In recent years, a bottlenecking of communication networks has occurred in the portion of the network known as the access network. Bandwidth on longhaul optical networks has increased sharply through new technologies such as wavelength division multiplexing (WDM) and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast via a remote node (RN) to optical network units (ONUs). In the upstream direction, ONUs typically time-share transmission of traffic in one wavelength. An ONU refers to a form of access node that converts optical signals transmitted via fiber to electrical signals that can be transmitted to individual subscribers and vice versa.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (Gb/s) by using more powerful transmitters, providing even greater bandwidth. Other PSPONs include, for example, asynchronous transfer mode PONs (APONs) and gigabit Ethernet PONs (GEPONs).

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten Mb/s, and some IP high definition television and video-on-demand systems presently require bit rates of approximately twenty Mb/s. Future demands for bandwidth are projected to be even greater. Moreover, demand for subscriber capacity is also projected to increase and serving larger numbers of subscribers with a single PON is desirable to reduce cost and utilize central office space more effectively. To further reduce cost of deployment of PONs it is desirable to extend the reach, which is typically 20 km for a PON with 32 subscribers. Subscriber capacity may typically be increased by increasing the split ratio of a shared transmission line. However, increasing the split ratio also increases the number of uses per shared transmission line, thereby decreasing the bandwidth per subscriber, and the increased power splitting results in less optical power per subscriber, negatively impacting the reach of the network.

SUMMARY

In accordance with the teachings of the present disclosure, a system and method for increasing reach and upstream capacity in an optical network are provided. In a particular embodiment, a method for communicating in a passive optical network (PON), includes receiving amplified traffic from a plurality of optical network units (ONUs) transmitting in an upstream transmission channel, wherein each of the ONUs may transmit at any wavelength within a wavelength band associated with the upstream transmission channel. The method also includes dividing the upstream transmission channel into a plurality of sub-channels, that each include a subset of the wavelength band associated with the upstream transmission channel. The method further includes dynamically determining the identity of each of the plurality of ONUs transmitting in each of the sub-channels, dynamically assigning a plurality of ONUs transmitting in the upstream transmission channel to each of at least two of the sub-channels based on the determination of the ONUs transmitting in that sub-channel, and allocating transmission timeslots for time-shared transmission by the ONUs in one or more of the sub-channels.

According to another embodiment, an optical line terminal (OLT) includes a plurality of receivers and a signal processing module. The plurality of receivers are configured to receive traffic in an upstream transmission channel from a plurality of ONUs, wherein each of the ONUs may transmit at any wavelength within a wavelength band associated with the upstream transmission channel. The signal processing module is configured to divide the upstream transmission channel into a plurality of sub-channels and dynamically determine the identity of each of the plurality of ONUs transmitting in each of the sub-channels. The signal processing module is further configured to dynamically assign a plurality of ONUs transmitting in the upstream transmission channel to each of at least two of the sub-channels based on the determination of the ONUs transmitting in that sub-channel and allocate transmission timeslots for time-shared transmission by the ONUs in one or more of the sub-channels.

Technical advantages of one or more embodiments may include a PON system that may address the upstream transmission bottleneck by providing higher upstream bandwidth per subscriber over a time-shared colorless transmission channel and at the same time increasing reach by improving the effectiveness of optical amplification. By dividing an upstream transmission channel into sub-channels and allocating timeslots for time-shared transmission in the sub-channels, the effective upstream transmission bandwidth may be increased without requiring multiple nominal wavelength (i.e., colored) upstream transmitters.

Another technical advantage of particular embodiments may include minimizing cost of cost-sensitive components in a passive optical network (PON). In particular, because lower cost components generally have greater variability in transmission wavelength, dividing a time-shared upstream transmission channel into sub-channels may advantageously address a highly variable distribution of transmission wavelengths that may result from using low cost components, and encouraging greater variability in transmission wavelength facilitating further reduction of cost. Another advantage is that as wavelength tunable lasers become more cost-effective in the future, a larger part of the full upstream aggregate capacity can be utilized by deploying such tunable transmitters.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
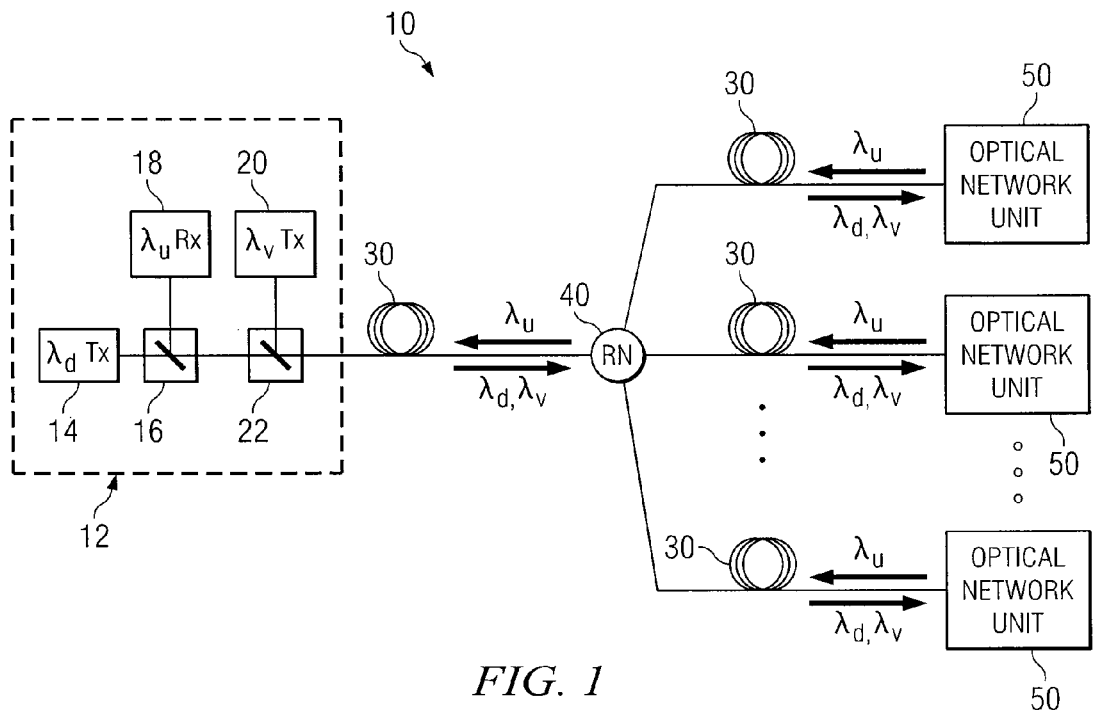
FIG. 1 is a diagram illustrating an example Power Splitting Passive Optical Network (PSPON) 10 according to a particular embodiment.

FIG. 1 is a diagram illustrating an example Power Splitting Passive Optical Network (PSPON) 10. Typically, PSPONs have been employed to address the bottlenecking of communications networks in the portion of the network known as the access network. In recent years, bandwidth on long haul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

PSPON 10 includes an Optical Line Terminal (OLT) 12, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a BPON, a GPON, a gigabit Ethernet PON (GEPON), or any other suitable PSPON. A feature common to all PSPONs 10 is that the outside fiber plant is completely passive. Downstream signals transmitted by the OLT are passively distributed by the RN to downstream ONUs coupled to the RN through branches of fiber, where each ONU is coupled to the end of a particular branch. Upstream signals transmitted by the ONUs are also passively forwarded to the OLT by the RN.

OLT 12, which may be an example of an upstream terminal, may reside at the carrier's central office, where it may be coupled to a larger communication network. OLT 12 includes a transmitter 14 operable to transmit traffic in a downstream wavelength, such as $\lambda d$, for broadcast to all ONUs 50, which may reside at or near customer sites. OLT 12 may also include a transmitter 20 operable to transmit traffic in a second downstream wavelength $\lambda v$ (which may be added to $\lambda d$) for broadcast to all ONUs 50. As an example, in typical GPONs, $\lambda v$ may carry analog video traffic. Alternatively, $\lambda v$ may carry digital data traffic. OLT 12 also includes a receiver 18 operable to receive traffic from all ONUs 50 in a time-shared upstream wavelength, $\lambda u$. OLT 12 may also comprise filters 16 and 22 to pass and reflect wavelengths appropriately. While a single transmitter 14 and receiver 18 are illustrated, OLT 12 may have multiple transmitters and receivers to accommodate downstream and upstream traffic demands.

It should be noted that, in typical PSPONs, downstream traffic in $\lambda d$ and $\lambda v$ is transmitted at a greater bit rate than is traffic in $\lambda u$, as higher serial rate and higher power transmitters are too costly to be included in every ONU. As a result, PSPONs typically provide lower upstream bandwidth than downstream bandwidth. Also, downstream transmitters are typically more powerful than upstream transmitters, and thus, downstream reach is greater than upstream reach. It should also be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal). It should further be noted that $\lambda d$ may include the band centered around 1490 nm, $\lambda v$ may include the band centered around 1550 nm, and $\lambda u$ may include the band centered around 1310 nm in particular PSPONs.

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers.

RN 40 of PSPON 10 (which may also generally be referred to as a distribution node) comprises any suitable power splitter, such as an optical coupler, and connects OLT 12 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 12.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers and vice versa. Subscribers may include residential and/or commercial customers. Each ONU 50 may be part of a cluster of ONUs assigned to transmit and/or receive traffic within a particular channel or wavelength band. Typically, PONs 10 have clusters that contain thirty-two ONUs 50 per OLT 12, and thus, many example PONs may be described as including this number of ONUs. However, any suitable number of ONUs per OLT may be provided.

To receive and transmit this traffic, each ONU 50 may comprise one or more receivers and transmitters (not illustrated). In particular embodiments, each ONU transmitter may comprise any suitable transmitter operable to transmit upstream traffic within a particular wavelength band. The transmission rate of the ONU transmitter is typically less than the transmission rate of the OLT transmitter (due to less demand for upstream capacity than for downstream capacity). Also, the power of the ONU transmitter is typically less than the power of the OLT transmitter, and thus, upstream reach is less than downstream reach. Each ONU 50 is operable to process its designated downstream traffic and to transmit upstream traffic according to an appropriate time-sharing protocol (such that the traffic transmitted by one ONU in $\lambda u$ does not collide with the traffic of other ONUs in $\lambda u$).

In operation, transmitter 14 of OLT 12 transmits downstream traffic for broadcast to ONUs 50 in $\lambda d$. Transmitter 20 of OLT 12 may also transmit downstream analog video traffic for broadcast to ONUs 50 in $\lambda v$. Traffic in $\lambda d$ passes filter 16 and is combined with $\lambda v$ at filter 22 (which passes $\lambda d$ and reflects $\lambda v$). The combined traffic then travels over optical fiber 30 to RN 40. RN 40 splits the downstream traffic into a suitable number of copies and forwards each copy to a corresponding ONU 50. Each ONU 50 receives a copy of the downstream traffic in $\lambda d$ and $\lambda v$ and processes the signal. Suitable addressing schemes may be used to identify which traffic is destined for which ONU 50.

In the upstream direction, each ONU 50 may transmit upstream traffic in $\lambda u$ along fiber 30 according to a suitable time-sharing protocol (such that upstream traffic does not collide). RN 40 receives the upstream traffic from each ONU 50 and combines the traffic from each ONU 50 into one signal (at, e.g., the RN's power splitter). RN 40 may then forward the combined traffic over fiber 30 to OLT 12. At OLT 12, the combined traffic is passed by filter 22 and reflected by filter 16 to receiver 18. Receiver 18 receives the signal and processes it. While a single receiver 18, is illustrated an OLT 12 may have any number of receivers 18.

During operation, the actual wavelength of upstream transmissions ($\lambda u$) from a given ONU 50 may naturally vary from a nominal wavelength of the transmission channel. The nominal wavelength of a channel may generally represent a central wavelength of a wavelength band for a channel. For example, the 1310 nm channel, may encompass a band of wavelengths and the 1310 nm wavelength may be the center of the band. The natural variation in upstream transmission wavelength may result from a combination of factors. For example, the manufacturing tolerance of a laser associated with the transmitter of each ONU 50 may cause the wavelength of upstream traffic to vary from ONU to ONU. In general, laser vendors typically give nominal wavelength variation numbers in the range of 2 nm to 6 nm. Additionally, variations between actual laser vendors may further increase this range by several nanometers. As another example, variations in ambient temperature may cause fluctuations in $\lambda u$ for a particular ONU 50. As a further example, $\lambda u$ may deviate from a nominal, wavelength due to the level of use. Because factors such as ambient temperature and level of use may fluctuate, the deviation of the upstream transmission wavelength $\lambda u$ from the nominal wavelength for a particular transmission channel may be dynamic.

Figure 2:
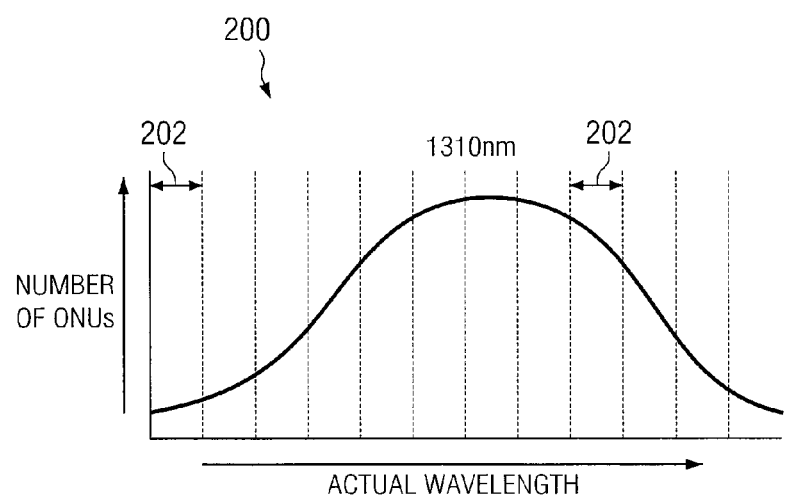
FIG. 2 is a graph illustrating the variation in wavelengths of upstream traffic in a transmission channel.

With reference to FIG. 2, a graph 200 illustrating example variations in wavelengths of upstream traffic $\lambda u$ for a 1310 nm channel is provided as a probability density curve for large numbers of ONUs. The x-axis indicates the actual wavelength ($\lambda u$) of upstream traffic transmitted by ONUs associated with the 1310 nm channel and the y-axis indicates the number of ONUs transmitting at the wavelength. Because manufacturing and temperature variations are typically random, the distribution of upstream transmission wavelengths $\lambda u$ for a cluster of ONUs 50 may generally be normally distributed around a nominal, upstream transmission wavelength (1310 nm). Due to dependency on actual operating conditions and location of the transmitters in the field, the shape and location of the distribution may change shape or shift over wavelength dynamically.

Given the variation in upstream transmission wavelengths across a time-shared upstream transmission channel, such a channel may be divided into a number of time-shared transmission sub-channels. Such a division is illustrated in FIG. 2. For purposes of this specification, a sub-channel may generally represent a subset of the band of wavelengths forming a transmission channel. Dividing a channel into multiple sub-channels 202 may generally increase the upstream transmission bandwidth for a cluster of ONUs 50 transmitting over a time-shared wavelength $\lambda u$. Specifically, such a division allows for transmission time-slots to be allocated and shared by ONUs transmitting in a sub-channel of the channel. Accordingly, dividing a time-shared upstream transmission channel into sub-channels may address the upstream transmission bottleneck in traditional PON systems without reducing subscriber (i.e., ONU) capacity. In the extreme where only one ONU transmits a wavelength within a given sub-channel this ONU may capture 100% of the available transmission capacity of the sub-channel unless this would interfere with transmission in a neighboring channel. Moreover, because the ONUs transmit using a common upstream channel, such a solution may be implemented into a colorless PON system.

Figure 3A:
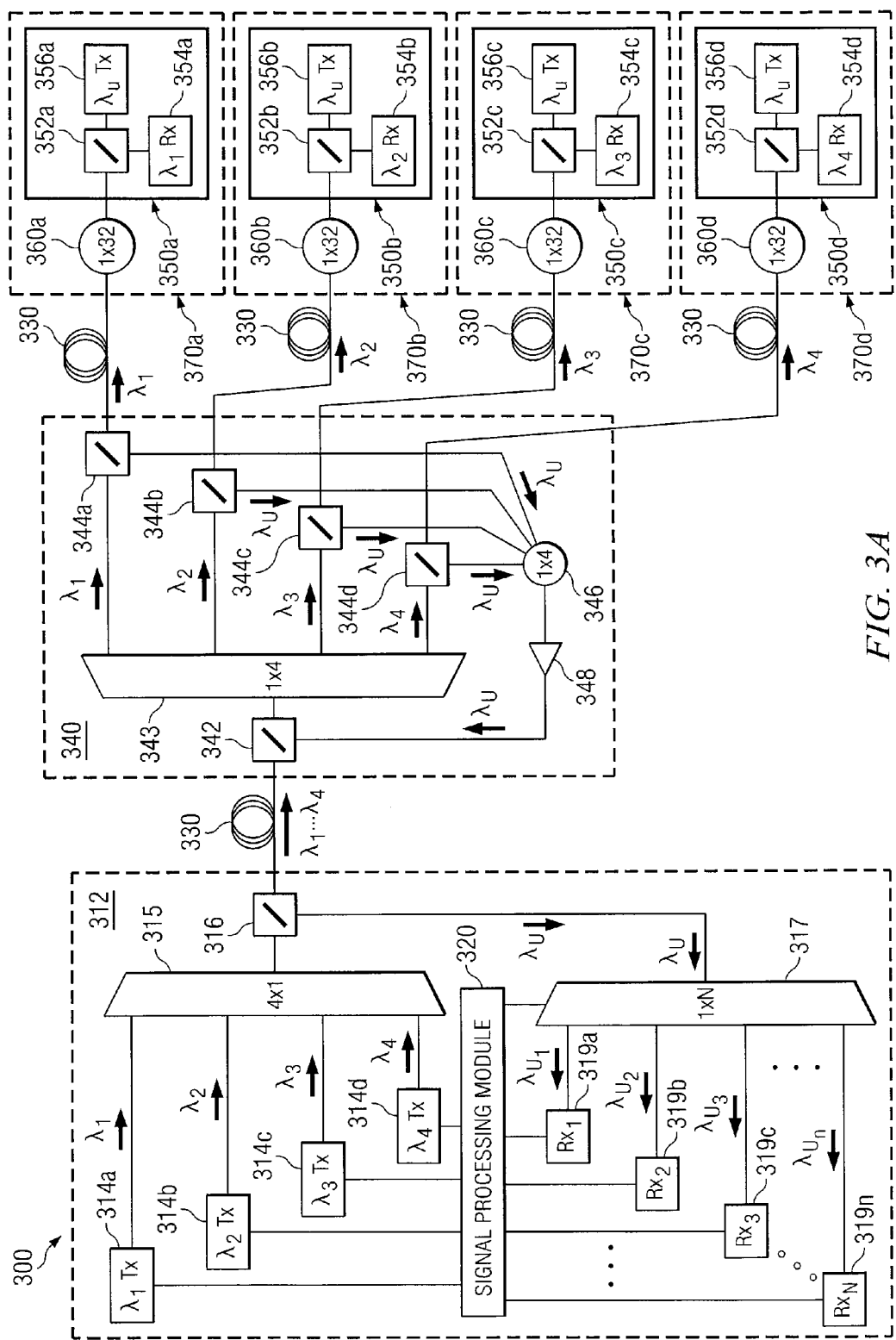
FIG. 3A is a diagram illustrating a Hybrid PON (HPON) according to a particular embodiment.

FIG. 3A is a diagram illustrating an example embodiment of a Hybrid PON (HPON) 300 utilizing the sub-channels described in conjunction with FIG. 2. HPON 300 comprises OLT 312, optical fiber 330, RN 340, and ONU clusters 370. In operation, signal processing module 320 may allow HPON 300 to simultaneously provide greater upstream bandwidth and greater subscriber capacity than standard PON systems by assigning ONUs 350 to sub-channels of a transmission channel and dynamically allocating transmission time-slots for ONUs sharing each sub-channel.

OLT 312 (which may be an example of an upstream terminal) may reside at a carrier's central office and comprises transmitters 314a-314d, multiplexer 315, filter 316, demultiplexer 317, and receivers 319a-319N. Each transmitter 314a-314d may comprise any suitable transmitter and is operable to receive routing information from signal processing module 320 and transmit traffic over a corresponding wavelength, $\lambda 1-\lambda 4$, respectively. In particular embodiments, transmitter(s) 314 may receive an upstream bandwidth allocation map from signal processing module 320 updated to manage transmission time slots within sub-channels. Transmitters 314 may then transmit these maps and/or traffic over a corresponding wavelength $\lambda 1-\lambda 4$, respectively. It should be noted that OLT 312 may comprise more or fewer transmitters 314. In the illustrated embodiment there is one transmitter 314 transmitting at a corresponding wavelength λ1-λ4 per thirty-two ONUs. However, any suitable number of ONUs 350 may share a wavelength λ1-λ4. Providing one transmitter 314 per thirty-two ONUs 350 (i.e., one transmitter 314 per ONU cluster 370) facilitates maintaining downstream bandwidth and performance levels notwithstanding the additional subscriber capacity offered by HPON 300.

Multiplexer 315 comprises any suitable multiplexer/demultiplexer or optical signal combiner and may combine the traffic in λ1-λ4 into one signal. In particular example networks, multiplexer 315 may comprise a cyclic multiplexer operable to receive and combine the traffic in more than one wavelength through each port. In other example networks, multiplexer 315 may be a typical M×1 multiplexer operable to receive only the traffic in one wavelength.

Filter 316 comprises any suitable filter operable to receive the traffic in λ1-λ4 from multiplexer 315 and pass the traffic in λ1-λ4 to RN 340. In the upstream direction, filter 316 is operable to receive traffic in λu and direct traffic in λu to demultiplexer 317.

Demultiplexer 317 may generally represent any suitable multiplexer/demultiplexer operable to receive traffic and filter or separate the traffic into sub-channels. More particularly, demultiplexer 317 may separate the traffic in λu into sub-channels (illustrated as λu1 . . . λun) and forward the output to an appropriate receiver 319. In general, the wavelength band of each sub-channel may be determined by the channel width of demultiplexer 317 pass bands. In alternative embodiments pass-bands may overlap.

Figure 3B:
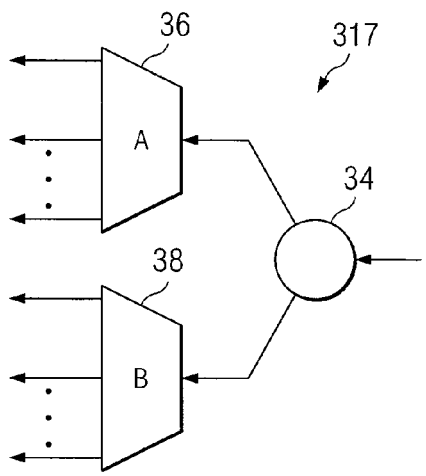
FIG. 3B is a diagram illustrating an example demultiplexer of FIG. 3A according to an alternative embodiment.
Figure 3C:
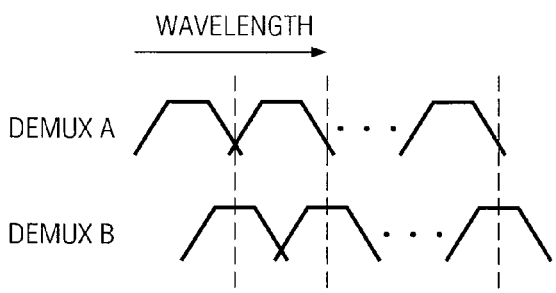
FIG. 3C is a diagram illustrating example channel characteristics of the example demultiplexer of FIG. 3A according to a particular embodiment.

It should be noted that, in alternative embodiments, demultiplexer 317 may comprise any combination of suitable devices or optical components configured to provide multiple optical passbands. For example, as illustrated in FIG. 3B, demultiplexer 317 may comprise a power splitter 34 coupled to two demultiplexers 36 and 38 (also referred to in FIG. 3B as demultiplexers A and B, respectively). These functions may be integrated in a single optical device. Power splitter 318 may be configured to receive an incoming signal, split the signal into two copies (of, e.g., approximately equal power), and forward a copy to each demultiplexer 36 and 38. Each demultiplexer 36 and 38 may be configured to demultiplex the received copy such that the approximate centers of passbands of the demultiplexer are aligned with the approximate edges of the passbands of the other demultiplexer, as illustrated in FIG. 3C. In particular other embodiments demultiplexer 317 may consist of a cyclic demultiplexer, demultiplexing a plurality of interleaved sub-channels into a single output. It should be noted that demultiplexer 317 may comprise any other suitable component or set of components in alternative embodiments.

Receivers 319a-319N may comprise any suitable receiver operable to receive and process upstream traffic from ONUs 350 carried over time-shared wavelength λu. In certain embodiments there may be one receiver 319 per sub-channel (λu1 . . . λun), although each receiver is operable to receive and process traffic over the entire λu channel. In other embodiments there may be fewer receivers than sub-channels. In such embodiments, demultiplexer 317 may comprise a cyclic multiplexer and each receiver 319 may be operable to process traffic in more than one sub-channel. More particularly, given an approximately normal distribution of ONU transmission wavelengths and relatively strong ambient temperature dependency of upstream transmit wavelength, at times certain sub-channels may comprise few or no ONUs (i.e., the sub-channels are unused). Therefore, providing a receiver 319 per sub-channel may not be unnecessary and inefficient Thus, a cyclic multiplexer may help distribute processing workload amongst receivers 319 and/or allow for HPON 300 to be designed such that there is less than one receiver 319 per sub-channel.

Signal processing module 320 may, along with other functions, assign and schedule upstream transmissions in sub-channels of a time-shared wavelength λu. In general, signal processing module 320 may represent a Time-Division Multiple Access (TDMA) Media Access Control (MAC) controller operable to dynamically scheduling concurrent upstream transmissions in sub-channels. Specific components of an example signal processing module 320 will be described in greater detail with respect to FIG. 4, however, signal processing module 320 may generally include any processing means as well as any suitable set of one or more components operable to store information about what ONUs are assigned to transmit in a particular sub-channel.

In operation, during a configuration stage, signal processing module 320 may receive upstream traffic from a plurality of ONUs 350 associated with a time-shared upstream transmission channel and assign ONUs to a sub-channel within the transmission channel based on the sub-channel in which the upstream traffic is received. Signal processing module 320 may analyze the traffic and determine in which sub-channel of λu each ONU 350 is currently transmitting. The identity of each ONU transmitting within a time-shared channel may be determined using ONU identifiers in the received traffic. After determining the wavelength of the traffic transmitted by one or more ONUs associated with a channel, signal processing module 320 may assign ONUs 350 to one or more sub-channels within the transmission channel. In certain embodiments, the assignment of sub-channels may be performed using a dynamic upstream transmission wavelength graph, such as, for example, the graph illustrated in FIG. 2. Generally, the number of sub-channels and size (i.e., wavelength band) of the sub-channels may be adjusted such that the number of ONUs 350 transmitting within a wavelength band of a given sub-channel is relatively equivalent. This may maximize upstream transmission bandwidth. At this point, signal processing module 320 may update its records regarding which ONUs are assigned to a given sub-channel.

After assigning one or more ONUs 350 to a sub-channel, signal processing module 320 may allocate transmission timeslots within the sub-channels. Specifically, if any sub-channel comprises multiple ONUs, signal processing module 320 may schedule timeslots to the ONUs 350 for time-shared transmission in the sub-channel. The scheduling may be performed by generating an upstream bandwidth allocation map(s) that allocate transmission timeslots to ONUs. Signal processing module 320 may forward the bandwidth allocation map(s), along with any other suitable information, to one or more transmitters 314 which may pass this information to ONUs 350. In this manner, upstream transmissions from ONUs 350 may be time-shared among sub-channels within a channel, rather than an entire channel. Thus, as described above, HPON 300 may provide a colorless PON system that offers increased upstream bandwidth.

The signal processing module 320 may continue monitoring and tracking transmit wavelengths of ONUs across sub-channels and revise the upstream sub-channel assignments and bandwidth allocation maps appropriately. The signal processing module 320 may take into account parameters such as capacity guarantees or measured bit error rate in assigning sub-channels and bandwidth to each ONU. In particular embodiments the signal processing module 320 may take into account optical cross-talk or interference between signals in particular sub-channels and synchronize and schedule transmission time slots in affected sub-channels appropriately to reduce or eliminate interference.

RN 340 comprises a primary filter 342, a demultiplexer 343, secondary filters 344a-344N, power splitters 360a-360d, combiner 346, and a Semiconductor Optical Amplifier (SOA) 348. In the downstream direction, RN 340 is operable to receive traffic in $\lambda 1$-$\lambda 4$, demultiplex the traffic into each constituent wavelength, $\lambda 1$-$\lambda 4$, split the traffic in each wavelength into a plurality of copies at power splitters 360, and forward each copy to a particular ONU 350 (with each cluster 370 receiving a different wavelength). In the upstream direction, RN 340 is operable to receive the traffic from multiple ONU clusters 370 in $\lambda u$ at secondary filters 344, combine the traffic into one signal, amplify the signal, and forward the traffic to OLT 312.

It should be noted that, in alternative embodiments, RN 340 may comprise any other suitable component(s) operable to route the traffic appropriately. It should also be noted that although RN 340 is referred to as a remote node, "remote" refers to RN 340 being communicatively coupled to OLT 312 and ONUs 350 in any suitable spatial arrangement. A remote node may also generally be referred to as a distribution node. It should be further noted that components of RN 340 may be included as components of OLT 312 or an ONU 350. For example, in certain embodiments SOA 348 (described below) may be included as part of OLT 312. In another example functions of the RN 340 may be included in OLT 312. For example, fiber 330, multiplexers 315 and 343, and filters 316 and 342 may be eliminated.

Primary filter 342 may comprise any suitable filter operable to receive a downstream signal from OLT 312 comprising traffic in $\lambda 1$-$\lambda 4$ and direct the signal to demultiplexer 343. In the upstream direction, filter 342 is operable to receive the traffic in $\lambda u$ from SOA 348 and direct it toward OLT 312.

Demultiplexer 343 may comprise any suitable multiplexer/demultiplexer (and may be considered a wavelength router) and is operable to receive the signal comprising the traffic in $\lambda 1$-$\lambda 4$ and demultiplex the signal. Each output port of demultiplexer 343 may forward traffic in a corresponding one of $\lambda 1$-$\lambda 4$ to a corresponding power splitter 360a-360d via secondary filters 344a-344d, respectively. Traffic in $\lambda 1$-$\lambda 4$ separated by demultiplexer 343 may be sent to a corresponding ONU cluster 370a-370d for processing.

Secondary filters 344a-344d may comprise any suitable filters operable to receive a downstream signal from demultiplexer 343 comprising traffic in $\lambda 1$-$\lambda 4$, respectively, and direct the signal to a corresponding power splitter 360. In the upstream direction, filter 344 is operable to receive the traffic in $\lambda u$ from ONUs 350 and direct it toward a combiner 346. It should be noted that in certain embodiments RN 340 may comprise more or fewer secondary filters 344 depending on the number of downstream wavelengths and/or ONUs 350 supported by HPON 300.

Combiner 346 comprises any suitable device operable to receive traffic in a plurality of channels from ONUs 350 via secondary filters 344a-344d, combine the traffic, and forward the traffic to SOA 348. In particular embodiments, combiner 346 may comprise one or more couplers (i.e., splitters). In alternative embodiments, combiner 346 may comprise one or more wavelength routers (i.e., multiplexers) or other set of filters. In yet alternative embodiments, combiner 346 may comprise a combination of one or more couplers and one or more wavelength routers. Although combiner 346 comprises a 1×4 power combiner in the illustrated embodiment, any other suitable combiner, or combination of combiners, may be used in alternative embodiments. In addition, in certain embodiments, RN 340 may not comprise a combiner 347 and traffic from ONUs 350 may be forwarded directly to one of a plurality of SOAs 348 via secondary filters 344a-344d.

SOA 348 comprises any suitable device operable to receive optical traffic and amplify the signal. While SOA 348 represents a semiconductor optical amplifier in the illustrated embodiment, any other suitable optical amplifier may be used either in conjunction with, or in place of, SOA 348. It should also be noted that in certain embodiments, RN 340 may comprise multiple SOAs 348 that each may be associated with an ONU cluster 370. It should further be noted that in certain embodiment one or more SOAs 348 may be positioned in front of combiner 346. In such an embodiment, an SOA 348 may be associated with traffic from a particular ONU cluster 370 and amplify the traffic associated with the cluster before the traffic is combined with traffic from other ONU clusters 370.

ONUs 350 may be arranged in ONU clusters 370a-370d that share a single downstream wavelength $\lambda 1$-$\lambda 4$. In the illustrated embodiment, each ONU cluster 370 comprises thirty-two ONUs 350, however, each ONU cluster 370 may comprise more or fewer ONUs 350. Alternatively, in certain embodiments, there may be multiple ONU clusters 370 that share a common downstream wavelength. Notwithstanding the downstream wavelength associated with a given ONU cluster 370, all ONUs 350 may share a common upstream channel or wavelength. Accordingly, HPON 300 may provide for colorless transmission in the upstream direction. A colorless PON system may advantageously allow for any ONU to be interchangeable with any other ONU in any location in HPON 300. It should be noted that ONUs 350 may be adjusted in an alternative upgrade to transmit traffic over multiple wavelengths to be received by receivers 354.

Power splitters 360a-360d may each comprise any suitable power splitter, such as an optical coupler, operable to receive downstream traffic in one of $\lambda 1$-$\lambda 4$, respectively, and split the traffic into thirty-two copies. The copies may be sent to one or more ONUs 350 within a ONU cluster 370. In general, the power of each copy may be less than one-thirty-second of the power of the original signal. Although power splitters 360 each comprise a 1×32 power splitter in the illustrated embodiment, any other suitable power splitter or group of power splitters may be used in alternative embodiments. In the upstream direction power splitters 360 may be operable to combine the traffic from the corresponding ONUs 350 in a ONU cluster 370. It should be noted that while power splitters 360 are illustrated as a component of a ONU cluster 370, power splitters 360 may be located remotely from an ONU cluster 370. For example, one or more power splitters 360 may be components of RN 340. Additionally, while the illustrated embodiment indicates that there is a single power splitter 360 associated with an ONU cluster 370, certain embodiments may have more or less power splitters 360 associated with any given ONU cluster 370. As one example, in one alternative embodiment downstream traffic may comprise a single channel, $\lambda d$ and there HPON 300 may comprise a single 1×128 power splitter 360 that divides traffic among all of the ONUs. In another alternative embodiment one or more power splitters 360 may be aligned in series to achieve a desired split-ratio.

Each ONU 350 (which may be an example of a downstream terminal) may comprise any suitable ONU or ONT. ONUs 350 may each comprise a filter 352, receiver 354, and transmitter 356. Filter 352 is further operable to pass the traffic in the corresponding one of $\lambda 1$-$\lambda 4$ received at the ONU 350 to receiver 354. In the upstream direction, filter 352 may pass traffic in upstream wavelength $\lambda u$ to RN 340. Receiver 354 may comprise any suitable receiver operable to receive the traffic transmitted in the corresponding λ1-λ4 and process the traffic. In certain embodiments, receiver 354 may be operable to receive traffic in any one of λ1-λ4, providing flexibility in assigning (or re-assigning) an ONU 550 to a particular wavelength-sharing group. Each transmitter 356 may comprise any suitable transmitter operable to transmit traffic over λu in the upstream direction, applying a suitable protocol to time-share λu with the other ONUs 350.

In operation, transmitters 314a-314d of OLT 312 transmit traffic over λ1-λ4, respectively. The traffic from each transmitter 314 is passed through multiplexer 315 which combines the traffic into one signal and forwards the signal to filter 316. As mentioned above, the traffic may include one or more bandwidth allocation maps that allocate timeslots for transmission by ONUs 350 in time-shared sub-channels. Filter 316 receives the signal and allows the signal to pass, forwarding the signal over optical fiber 330 to RN 340.

Filter 342 of RN 340 receives the signal comprising traffic in λ1-λ4 and directs the traffic to demultiplexer 343. In response to receiving the signal, demultiplexer 343 demultiplexes the signal into its constituent wavelengths. Demultiplexer 343 then forwards the traffic in each wavelength to a secondary filter 344. Each secondary filter 344 passes the traffic along a corresponding fiber such that power splitters 360a-360b receive the traffic in a corresponding one of λ1-λ4. In the illustrated embodiment, each power splitter 360 splits the signal into thirty-two copies. In this way, the traffic in one of λ1-λ4 is transmitted to and shared by one or more ONU clusters 370. It should be noted again that the ONU clusters sharing a downstream wavelength may be different than those illustrated in FIG. 3, and groups of wavelength-sharing ONUs may share more than one WDM wavelength in alternative networks.

After power splitters 360 split the signal comprising the traffic in a corresponding one of λ1-λ4 into thirty-two copies, power splitters 360 may forward each copy over fiber 330 such that a corresponding ONU cluster 370 coupled to the power splitter 343 receives a copy. Filter 352 of each ONU 350 receives the traffic in a corresponding one of λ1-λ4 and directs the traffic to receiver 354 which then processes the traffic. Again, since each ONU 350 in a ONU cluster 370 may share one of λ1-λ4 with other ONUs 350 in the ONU cluster, ONUs 350 may apply a suitable addressing protocol to process downstream traffic appropriately (i.e., to determine which portion of the traffic transmitted in the corresponding wavelength is destined for which ONU 350 in a cluster).

In the upstream direction, transmitter 356 of each ONU 350 transmits traffic over time-shared λu (as noted above, each ONU 350 may naturally transmit in a particular sub-channel of λu). To facilitate time-shared transmission over the various sub-channels of λu, each transmitter 356 may use the upstream sub-channel bandwidth allocation map generated by signal processing module 320. Filters 352 of each ONU receive the traffic in λu and pass the traffic. The traffic from each ONU 350 in a ONU cluster 370 may be combined by a respective power splitter 360. The combined signal travels over fiber 330 to RN 340 where it is received by a secondary filter 344. Each secondary filter 344 passes the upstream traffic in time-shared wavelength λu to combiner 346, which receives and combines the traffic from each ONU cluster 370 into one signal. This signal is then forwarded to SOA 348 which amplifies the signal and forwards it to filter 342. Filter 342 receives the combined traffic in λu and directs the traffic toward OLT 312. Fiber 330 carries the traffic in λu to filter 316 of OLT 312.

Filter 316 receives the traffic in λu and directs the traffic toward demultiplexer 317. Demultiplexer 317 may demultiplex the signal into constituent sub-channels ($\lambda u1 \ldots \lambda un$) as assigned by signal processing module 320. The demultiplexed traffic may then be forwarded to an appropriate receiver 319 for processing. As discussed above, in certain embodiments there may be a dedicated receiver 319 for processing traffic in each sub-channel ($\lambda u1 \ldots \lambda un$). In other embodiments, demultiplexer 317 may be a cyclic demultiplexer and a single receiver 319 may process traffic in multiple sub-channels as a single sub-channel. The demultiplexed traffic or information regarding the demultiplexed traffic may be passed to signal processing module 320 via one or more receivers 319. Signal processing module 320 may receive the traffic and/or information and reassign sub-channels and generate new bandwidth allocation maps as may be required.

As discussed, during operation, the actual transmission wavelength of an ONU may be dynamic. Thus, an ONU 350 transmitting within one sub-channel of a shared transmission channel at one time may be transmitting within another sub-channel of the shared transmission channel at a second time. As addressed above, such a shift may be brought about as a result of the level of use or variations in ambient temperature. In certain embodiments, signal processing module 320 is operable to manage wavelength drift across sub-channels. An example of managing wavelength drift across channels is described in U.S. patent application Ser. No. 11/945,590 entitled "System and Method for Managing Wavelength Drift in an Optical Network" filed on Nov. 27, 2007. The teachings of this application may be incorporated into HPON 300 to manage wavelength drift across sub-channels ($\lambda u_1 \ldots \lambda un$).

To highlight the increased upstream transmission bandwidth that may be provided by HPON 300, the following example is provided wherein the distribution of actual transmission wavelengths of ONUs 350 is assumed to be approximately normal with a standard deviation of 1.5 nm. For purposes of this example, it will be assumed that each sub-channel has a 0.5 nm width and that the upstream transmission capacity for a single channel is 1.2 G. As discussed, the sub-channel width may be determined by the channel width of demultiplexer 317. Accordingly, approximately sixty-eight percent of ONUs 350 will transmit within one standard deviation from the average and will effectively share three upstream channels. Therefore, by dividing time-shared transmission wavelength λu into time-shared sub-channels ($\lambda u1 \ldots \lambda un$) having wavelength bands of 0.5 nm width, approximately twenty-three percent of ONUs 350 may share 1.2 G of bandwidth. Thus, in the case of HPON 300, which in the illustrated embodiment has a split ratio of one-hundred twenty-eight, there will be approximately thirty ONUs 350 per 1.2 G of bandwidth.

Therefore, HPON 300 may provide greater upstream bandwidth per ONU 350 while simultaneously supporting a higher split ratio than a standard PON system. For example, a typical GPON may provide 1.2 G of bandwidth capacity for thirty-two subscribers and is limited to thirty-two ONUs sharing one upstream transmission channel (i.e., a split ratio of 32). By contrast, the illustrated embodiment of HPON 300 supports one-hundred twenty-eight ONUs that share one upstream transmission channel (λu) (i.e., a split ratio of 128) and may provide greater bandwidth per ONU 350 (1.2 G per thirty ONUs). Moreover, by using four transmitters 314a-314d at OLT 312, the downstream capacity of HPON 300 is substantially equivalent to standard GPONs that typically provide one upstream transmitter per thirty-two downstream ONUs. Accordingly, HPON 300 may provide a colorless PON architecture that increases the split ratio and average upstream bandwidth per ONU.

It should be noted that while the illustrated embodiment of HPON 300 has a split ratio of one-hundred twenty-eight, the split ratio in certain embodiments of HPON 300 may be higher or lower. For instance, in certain applications, where large upstream bandwidth per ONU is required, HPON 300 may comprise less than one-hundred twenty-eight ONUs 350. Thus, a trade-off may be made between split-ratio and upstream bandwidth per ONU 350 based on system requirements.

In certain embodiments, system costs of HPON 300 may be reduced by using low cost lasers in transmitters 356 of ONUs 350. Low-cost lasers generally have reduced wavelength accuracy requirements and will thus exhibit greater variation in transmission wavelengths. Given that increasing variation in transmission wavelengths of transmitters 356 will correspond to a higher standard deviation of the upstream transmission distribution of ONUs within a time-shared transmission channel, a nominal increase in transmission variability of transmitters 356 may generally lead to fewer ONUs transmitting in a given sub-channel. Accordingly, a nominal increase in the variability of transmitters 356 may have the advantageous effect of increasing the effective bandwidth of HPON 300. Thus, HPON 300 may not only provide increased effective bandwidth at a higher split ratio than a typical PON system, it may also be more cost effective.

Modifications, additions, or omissions may be made to the example systems and methods described without departing from the scope of the invention described with respect to FIGS. 3a-3c. The components of the example methods and systems described may be integrated or separated according to particular needs. Moreover, the operations of the example methods and systems described may be performed by more, fewer, or other components.

Figure 4:
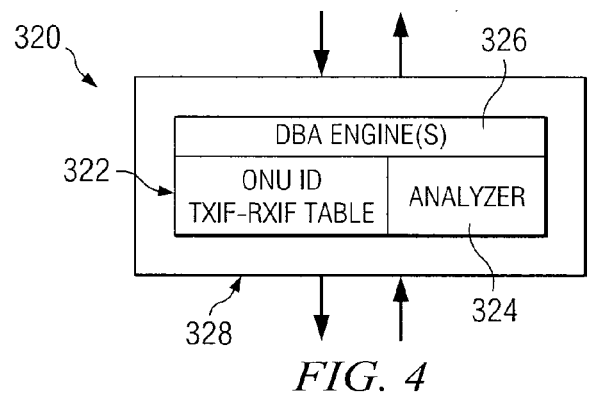
FIG. 4 is a diagram illustrating an example signal processing module according to a particular embodiment.

Referring now to FIG. 4, the architecture of an example signal processing module 320 will be described in greater detail. As illustrated, signal processing module 320 comprises a ONU-ID-TXIF reachability table 322, analyzer 324, and a dynamic bandwidth allocation (DBA) engine 326. Reachability table 322 comprises any suitable table or other collection of data operable to store information about what ONUs are assigned to transmit in what upstream sub-channels (using, e.g., a receiver interface identifier). Reachability table 322 may also store allocated sub-channel transmission time slots for ONUs transmitting in a given upstream sub-channel.

Analyzer 324 comprises any suitable device operable to receive traffic in the sub-channels of $\lambda u$ from one or more ONUs and dynamically schedule upstream transmissions in sub-channels. In operation, analyzer 324 may receive traffic from the ONUs and, for each of the plurality of ONUs, determine a sub-channel in which each ONU is currently transmitting. Analyzer 324 may determine the identity of the ONUs by, for example, ONU identifiers in the traffic. Based on this information, analyzer 324 may assign ONUs to one or more sub-channels within $\lambda u$. It should be noted that the number of sub-channels and the spacing (i.e., wavelength band) of the sub-channels may be adjusted such that the number of ONUs transmitting within the wavelength band of a given sub-channel is relatively equivalent. This may maximize upstream transmission bandwidth. After assigning ONUs transmitting in $\lambda u$ to sub-channels of $\lambda u$, analyzer 324 may update reachability table 322.

It should be noted that, in particular embodiments, analyzer 324 may optionally employ information on transmitter wavelength or information related to wavelength such as transmitter temperature, environmental temperature, transmitter junction voltage, or transmitter bias current obtained from one or more ONUs, to confirm whether a ONU is transmitting in a particular sub-channel and whether sub-channel drift may have occurred. Analyzer 322 may also use information samples collected from local or remote sources to predict drifting into a sub-channel or channel and preemptively schedule time slots in any suitable manner to avoid collisions.

DBA engine(s) 326 may comprise one or more DBA engines operable to dynamically generate one or more upstream bandwidth allocation maps (for upstream transmission by ONUs) based on the information in reachability table 322. After analyzer 324 assigns ONUs transmitting over a time-shared channel to sub-channels within the channel and updates reachability table 322, DBA engine(s) 326 may use the updated information in reachability table 322 to generate upstream bandwidth allocation map(s) that allocate timeslots in a time-shared sub-channel to ONUs transmitting in the sub-channel. For example, DBA engine(s) 326 may determine that a plurality of ONUs are assigned to transmit in a common sub-channel and allocate transmission timeslots within the sub-channel to such ONUs. DBA engine(s) 326 are operable to send the upstream bandwidth allocation map(s) to downstream transmitters (such as transmitters 314 of FIG. 3) so that the upstream bandwidth allocation map(s) may be passed to the appropriate ONUs.

After assigning ONUs to sub-channels, analyzer 324 may determine whether any sub-channel comprises multiple ONUs. In such a case, analyzer 324 may schedule timeslots to ONUs for transmission in the time-shared sub-channel. After scheduling transmission time-slots in one or more time-shared sub-channels, analyzer 324 may update reachability table 322.

Figure 5:
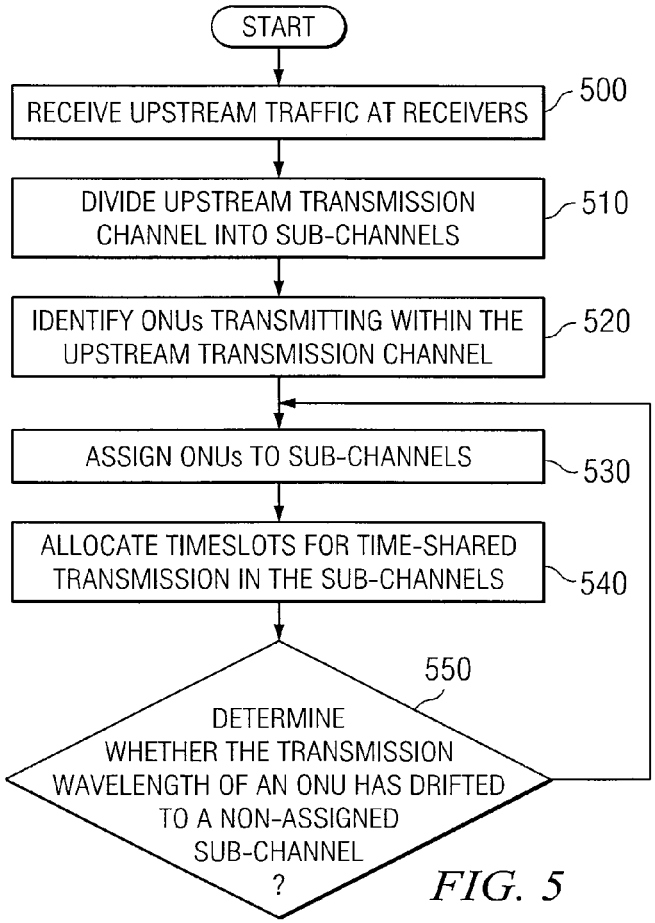
FIG. 5 is a diagram illustrating a method for increasing upstream capacity in a optical network according to a particular embodiment.

FIG. 5 is a flowchart illustrating a method for increasing upstream capacity in an optical network. The described method begins at step 500 where upstream traffic from a plurality of ONUs 350 is received by signal processing module 320. As illustrated in FIG. 3A, traffic in $\lambda u$ may initially be received at OLT 312 by filter 316 and passed to demultiplexer 317. In response to receiving the traffic, demultiplexer 317 may demultiplex the traffic into sub-channel wavelengths ($\lambda u1 \ldots \lambda un$) and forward traffic in each of these wavelengths to an appropriate receiver 318. Each receiver 318 may process traffic in a specified sub-channel wavelength ($\lambda u1 \ldots \lambda un$) and forward it to signal processing module 320. In an alternate embodiment, upstream traffic in sub-channel wavelengths ($\lambda u1 \ldots \lambda un$) may be passed to signal processing module 320 by demultiplexer 317. In another alternate embodiment, demultiplexer 317 may pass upstream traffic in $\lambda u$ to signal processing module 320 without demultiplexing the signal. In yet another alternate embodiment, signal processing module 320 may receive upstream traffic in $\lambda u$ directly from filter 316.

At step 510, signal processing module 320 divides an upstream transmission channel wavelength band into sub-channels. As discussed, a sub-channel may comprise a subset of the band of wavelengths forming a transmission channel. The size (i.e., wavelength band) of individual sub-channels as well as the number of sub-channels may be determined using any suitable algorithm or protocol. For example, a transmission channel may be divided into sub-channels such that the number of ONUs 350 transmitting in any given sub-channel is approximately equal. Accordingly, because a ONUs 350 may generally tend to transmit near the nominal wavelength of a channel, sub-channels comprising wavelengths near the nominal wavelength of a channel may be narrow compared to sub-channels comprising wavelengths more remote from the nominal wavelength of the channel.

Next, at step 520, signal processing 320 module may determine the identity of each ONU 350 transmitting within a channel. Identification of ONUs 350 may be performed by analyzer 324 of signal processing module 320, which may detect ONU identifiers in the received upstream traffic. Identification of ONUs 350 may also be performed using bandwidth allocation map information and/or reachability table information. After determining the identity of each ONU transmitting within a channel, signal processing module 320 may assign ONUs 350 to a sub-channel within the upstream transmission channel, at step 530. The assignment of ONUs 350 to sub-channels may comprise determining a sub-channel in which each ONU is currently transmitting and pairing each ONU with that sub-channel. At this point, signal processing module 320 may update a record, such as reachability table 322, comprising the sub-channel assignments of ONUs 350. It should be noted that in certain embodiments step 510-step 530 may be performed simultaneously such that the division of the upstream transmission channel into sub-channels is based, in part, on the actual transmission wavelengths of ONUs transmitting in a channel.

At step 540, signal processing module 320 may allocate transmission timeslots in sub-channels to ONUs 350 for time-shared transmission. Allocating sub-channel transmission timeslots may comprise determining whether a plurality of ONUs are assigned to any one sub-channel. If so, then transmission time-slots for the sub-channel may be allocated amongst the plurality of ONUs assigned to the sub-channel. As discussed above, the allocation of sub-channel transmission timeslots may be performed by DBA engine(s) 326 of signal processing module 320. In particular, DBA engine(s) 326 may generate upstream bandwidth allocation maps that allocate timeslots in sub-channels. Once generated, the upstream bandwidth allocation maps may be passed on to ONUs 350 via one or more transmitters 314.

Next, at step 550, signal processing module 320 may monitor received upstream traffic to determine whether the wavelength at which each ONU transmits has drifted to a new (non-assigned) sub-channel. For example, analyzer 324 of signal processing module 320 may determine that an ONU's traffic has drifted to a non-assigned sub-channel by detecting noise from a particular receiver 318 (i.e., a collision in a channel) and/or detecting the absence of traffic in a sub-channel for a timeslot assigned to an ONU 350. If it is determined that the wavelength at which an ONU 350 transmits has drifted into a non-assigned sub-channel, signal processing module 320 may return to step 530 and assign the ONU 350 to an appropriate sub-channel. Alternatively, signal processing module 320 may return to step 510 and divide the transmission channel into new sub-channels to ensure that the assignment of ONUs 350 to sub-channels is balanced.

It should be noted that modifications, additions, or omissions may be made to the method depicted in FIG. 5. In certain embodiments, the method may include more, fewer, or other steps. Additionally, steps may be performed in any suitable order without departing from the scope of the invention.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components. It should also be noted that the example systems and methods may be modified in any suitable manner to assign and manage transmissions within sub-channels of an upstream transmission channel. Additionally, while the present invention has been described with several embodiments, various changes and modifications may be suggested to one skilled in the art. It is intended that the present invention encompass such changes and modifications as fall within the scope of the appended claims.

What is claimed is:

1. A method for communicating in a passive optical network (PON), comprising:
    receiving traffic from a plurality of optical network units (ONUs) transmitting in an upstream transmission channel, wherein each of the ONUs may transmit at any wavelength within a wavelength band associated with the upstream transmission channel, and wherein the wavelengths at which the plurality of ONUs transmit are normally distributed around a single nominal, upstream transmission wavelength of the upstream transmission channel, the normal distribution of the wavelengths having a standard deviation;
    dividing the upstream transmission channel into a plurality of sub-channels, wherein each of the plurality of sub-channels comprises a subset of the wavelength band associated with the upstream transmission channel, and wherein each of the plurality of sub-channels has a wavelength band that is less than the standard deviation of the normal distribution of the wavelengths;
    dynamically determining the identity of each of the plurality of ONUs transmitting in each of the sub-channels;
    dynamically assigning each of the plurality of ONUs transmitting in the upstream transmission channel to at least one of the sub-channels based on the determination that the ONU is transmitting in that sub-channel, wherein at least two ONUs are assigned to the same sub-channel;
    allocating transmission timeslots for time-shared transmission by the ONUs assigned to the same sub-channel; and
    after dynamically assigning the ONUs to sub-channels, determining that one or more of the ONUs is transmitting in a different sub-channel than the assigned sub-channel.

2. The method of claim 1, further comprising:
    amplifying a signal comprising traffic in the upstream channel; and
    after amplifying the signal, demultiplexing the signal into a plurality of signals each comprising traffic associated with one of the plurality of sub-channels.

3. The method of claim 2, further comprising receiving each of the plurality of signals at one of a plurality of receivers, wherein the number of receivers is less than the number of signals.

4. The method of claim 1, further comprising:
    transmitting traffic in a first downstream channel to a first cluster of ONUs, the first cluster of ONUs comprising one or more of the plurality of ONUs; and
    transmitting traffic in a second downstream channel to a second cluster of ONUs, the second cluster of ONUs comprising one or more of a plurality of ONUs.

5. The method of claim 1, further comprising:
    determining whether traffic in a first sub-channel of the plurality of sub-channels was transmitted by an ONU that was not assigned to transmit in the first sub-channel; and
    if the traffic in the first sub-channel was transmitted by an ONU that was not assigned to transmit in the first sub-channel:
        identifying the ONU that was not assigned to transmit in the first sub-channel but that did transmit in the first sub-channel; and assigning the identified ONU to transmit in the first sub-channel.

6. The method of claim 1, further comprising:
receiving traffic associated with a first sub-channel of the plurality of sub-channels; and
receiving traffic associated with a second sub-channel of the plurality of sub-channels.

7. The method of claim 1, wherein allocating transmission timeslots for time-shared transmission in one or more of the plurality of sub-channels comprises generating a bandwidth allocation map, the bandwidth allocation map allocating timeslots for transmission in the at least two or more of the plurality of sub-channels.

8. The method of claim 7, wherein allocating transmission timeslots for time-shared transmission in two or more of the plurality of sub-channels further comprises transmitting a bandwidth allocation map to two or more of the plurality of ONUs.

9. The method of claim 1, wherein assigning a plurality of ONUs transmitting in the upstream transmission channel to each of at least two of the sub-channels comprises storing information in a table that associates each ONU transmitting in the upstream transmission channel with one of the plurality of sub-channels.

10. An optical line terminal (OLT), comprising:
a plurality of receivers configured to receive traffic in an upstream transmission channel from a plurality of ONUs, wherein each of the ONUs may transmit at any wavelength within a wavelength band associated with the upstream transmission channel, and wherein the wavelengths at which the plurality of ONUs transmit are normally distributed around a single nominal, upstream transmission wavelength of the upstream transmission channel, the normal distribution of the wavelengths having a standard deviation; and
a signal processing module configured to:
divide the upstream transmission channel into a plurality of sub-channels, wherein each of the plurality of sub-channels comprises a subset of the wavelength band associated with the upstream transmission channel, and wherein each of the plurality of sub-channels has a wavelength band that is less than the standard deviation of the normal distribution of the wavelengths;
dynamically determine the identity of each of the plurality of ONUs transmitting in each of the sub-channels;
dynamically assign each of the plurality of ONUs transmitting in the upstream transmission channel to at least one of the sub-channels based on the determination that the ONU is transmitting in that sub-channel, wherein at least two ONUs are assigned to the same sub-channel;
allocate transmission timeslots for time-shared transmission by the ONUs assigned to the same sub-channel; and
after dynamically assigning the ONUs to sub-channels, determining that one or more of the ONUs is transmitting in a different sub-channel than the assigned sub-channel.

11. The OLT of claim 10, wherein a signal processing module configured to assign each of the plurality of ONUs to one of a plurality of sub-channels comprises a processor configured to:
receive traffic associated with each of the plurality of ONUs; and
determine a wavelength at which each of the plurality of ONUs transmits.

12. The OLT of claim 10, wherein the number of receivers is less than the number of sub-channels.

13. The OLT of claim 10, wherein a plurality of receivers configured to receive traffic in an upstream transmission channel comprises a plurality of receivers configured to received a demultiplexed signal, the demultiplexed signal comprising traffic in at least one of the plurality of sub-channels.

14. The OLT of claim 13, wherein the plurality of receivers are further configured to receive an amplified signal.

15. The OLT of claim 10, further comprising a transmitter configured to transmit traffic in a downstream channel to a to the plurality of ONUs.

16. The OLT of claim 10, further comprising:
a first transmitter configured to transmit traffic in a first downstream channel to a first cluster of ONUs, the first cluster of ONUs comprising one or more of the plurality of ONUs; and
a second transmitter configured to transmit traffic in a second downstream channel to a second cluster of ONUs, the second cluster of ONUs comprising one or more of the plurality of ONUs.

17. The OLT of claim 10, further comprising a demultiplexer configured to:
receive an amplified signal; and
separate the signal into a plurality of signals each associated with at least one of the plurality of sub-channels.

18. The OLT of claim 17, wherein the demultiplexer is a cyclic demultiplexer.

19. The OLT of claim 10, wherein a signal processing module configured to allocate transmission timeslots for time-shared transmission by the ONUs in one or more of the sub-channels, comprises a signal processing module configured to generate a dynamic bandwidth allocation map.

20. The OLT of claim 10, wherein the signal processing module is further configured to:
determine whether traffic in a first sub-channel of the plurality of sub-channels was transmitted by an ONU that was not assigned to transmit in the first sub-channel; and
if the traffic in the first sub-channel was transmitted by an ONU that was not assigned to transmit in the first sub-channel:
identify the ONU that was not assigned to transmit in the first sub-channel but that did transmit in the first sub-channel; and
assign the identified ONU to a transmit in the first sub-channel.

21. The OLT of claim 10, wherein the signal processing module is further configured to balance the number of ONUs assigned to each of the plurality of sub-channels.

22. The OLT of claim 10, wherein the signal processing module is further configured to store information in a table that associates each of the one or more of the plurality of ONUs transmitting in the upstream transmission channel with at least one of the plurality of sub-channels.

23. A passive optical network (PON) comprising:
means for receiving traffic from a plurality of optical network units (ONUs) transmitting in an upstream transmission channel, wherein the plurality of ONUs each transmit at a different wavelength within a band of wavelengths associated with the upstream transmission channel, and wherein the wavelengths at which the plurality of ONUs transmit are normally distributed around a single nominal, upstream transmission wavelength of the upstream transmission channel, the normal distribution of the wavelengths having a standard deviation;

means for dividing the upstream transmission channel into a plurality of sub-channels, wherein each of the plurality of sub-channels comprises a subset of the band of wavelengths associated with the upstream transmission channel, and wherein each of the plurality of sub-channels has a wavelength band that is less than the standard deviation of the normal distribution of the wavelengths;

means for determining the identity of each of the plurality of ONUs transmitting in the upstream transmission channel;

means for assigning each of the plurality of ONUs transmitting in the upstream transmission channel to at least one of the plurality of sub-channels based on the determination that the ONU is transmitting in that sub-channel, wherein at least two ONUs are assigned to the same sub-channel;

means for allocating transmission timeslots for time-shared transmission by the ONUs assigned to the same sub-channel; and means for determining, after dynamically assigned the ONUs to sub-channels, that one or more of the ONUs is transmitting in a different sub-channel than the assigned sub-channel.

* * * * *

UNITED STATES PATENT AND TRADEMARK OFFICE
CERTIFICATE OF CORRECTION

| | | |
|---|---|---|
| PATENT NO. | : 8,948,598 B2 | Page 1 of 1 |
| APPLICATION NO. | : 12/233224 | |
| DATED | : February 3, 2015 | |
| INVENTOR(S) | : Martin Bouda | |

It is certified that error appears in the above-identified patent and that said Letters Patent is hereby corrected as shown below:

On the Title Page, item (60),

Under Related U.S. Application Data:

After "Provisional application No." delete "61/028,336" and insert -- 61/028,366 --.

Signed and Sealed this
Fifth Day of May, 2015

Michelle K. Lee
*Director of the United States Patent and Trademark Office*